(12) United States Patent
Jarr (10) Patent No.: US 10,932,564 B2
(45) Date of Patent: Mar. 2, 2021

(54) DEVICE AND METHOD FOR STORING ITEMS USING A RACK

(71) Applicant: Dematic GmbH, Heusenstamm (DE)

(72) Inventor: Daniel Jarr, Offenbach (DE)

(73) Assignee: Dematic GmbH, Heusenstamm (DE)

( * ) Notice: Subject to any disclaimer, the term of this patent is extended or adjusted under 35 U.S.C. 154(b) by 18 days.

(21) Appl. No.: 16/275,003

(22) Filed: Feb. 13, 2019

(65) Prior Publication Data

US 2019/0246792 A1  Aug. 15, 2019

(30) Foreign Application Priority Data

Feb. 15, 2018 (DE) .......................... 102018103390.7

(51) Int. Cl.
| | |
|---|---|
| *B65G 1/04* | (2006.01) |
| *A47B 57/06* | (2006.01) |
| *B65G 1/16* | (2006.01) |
| *B65G 1/02* | (2006.01) |
| *A47B 51/00* | (2006.01) |
| *A47B 47/00* | (2006.01) |

(52) U.S. Cl.
CPC .......... *A47B 51/00* (2013.01); *A47B 47/0091* (2013.01); *A47B 57/06* (2013.01); *B65G 1/02* (2013.01); *B65G 1/04* (2013.01); *B65G 1/16* (2013.01)

(58) Field of Classification Search
CPC ......... A47B 57/06; A47B 57/20; A47B 57/58; B65G 1/02; B65G 1/10; B65G 1/14; B65G 1/16

USPC ........................................ 211/175; 220/23.89
See application file for complete search history.

(56) References Cited

U.S. PATENT DOCUMENTS

| | | | | |
|---|---|---|---|---|
| 3,272,581 | A | * | 9/1966 | Stucki .................. A47B 47/025 312/234.4 |
| 3,360,137 | A | * | 12/1967 | Novales .................. A47B 57/30 211/175 |
| 3,938,666 | A | * | 2/1976 | Castleberry ............ A47B 57/58 211/59.2 |
| 4,955,490 | A | | 9/1990 | Schäfer |
| 5,149,240 | A | | 9/1992 | Di Rosa |
| 6,739,463 | B2 | * | 5/2004 | Wishart ............... A47B 47/027 211/175 |
| 9,315,337 | B2 | | 4/2016 | Cavelius |
| 9,738,462 | B2 | | 8/2017 | Cavelius |
| 9,776,812 | B2 | | 10/2017 | Cavelius |
| 9,862,556 | B2 | | 1/2018 | Cavelius |

(Continued)

FOREIGN PATENT DOCUMENTS

| | | |
|---|---|---|
| DE | 3644692 A1 | 7/1988 |
| DE | 29803113 U1 | 4/1998 |

(Continued)

*Primary Examiner* — James Keenan
(74) *Attorney, Agent, or Firm* — Gardner, Linn, Burkhart & Ondersma LLP (57) ABSTRACT

A device for storing items having a rack that is provided with storage compartments, and having a rack serving apparatus. In order to place items into storage and to remove them from storage, the rack serving apparatus and the rack can move horizontally and vertically relative to one another, with the rack having a variable adjustment of the storage compartments by way of storage compartment divisions that can be variably set both in the horizontal and also in the vertical direction and bear the item.

11 Claims, 7 Drawing Sheets

(56) References Cited

U.S. PATENT DOCUMENTS

| | | |
|---|---|---|
| 2004/0238470 A1 | 12/2004 | Wishart et al. |
| 2019/0059579 A1* | 2/2019 | Earl ........................ A47B 57/34 |
| 2019/0143872 A1* | 5/2019 | Gil ......................... B65G 1/065 |
| | | 211/86.01 |

FOREIGN PATENT DOCUMENTS

| | | | |
|---|---|---|---|
| DE | 102014118117 A1 | 6/2016 | |
| EP | 1471015 | 10/2004 | |
| EP | 1597986 A1 * | 11/2005 | ............. B62B 3/006 |
| EP | 2476635 A1 * | 7/2012 | ............... B65G 1/02 |
| EP | 2824046 A1 | 1/2015 | |
| JP | 2006168854 A | 6/2006 | |

* cited by examiner

DEVICE AND METHOD FOR STORING ITEMS USING A RACK

CROSS REFERENCE TO RELATED APPLICATION

The present application claims priority of German patent application 10 2018 103 390.7 filed Feb. 15, 2018.

BACKGROUND AND FIELD OF THE INVENTION

The present invention is directed to a device and method for storing items using a rack, which is provided with storage compartments and a rack serving apparatus. In order to place items into storage and to remove them from storage the rack serving apparatus and the rack can move horizontally and vertically relative to one another.

Storage structures are known, including EP 1 471 015 B1, which discloses a store in which trays can be placed in vertically provided support brackets. Likewise, EP 2 824 046 A1 discloses a similar store in which vertical storage compartment dividers in the form of stanchions can additionally be installed in order to divide storage compartments.

SUMMARY OF THE INVENTION

The present invention provides advantageous embodiments of a highly flexible device and method for storing items in a rack. According to an aspect of the present invention, when the rack has variable adjustment of the storage compartments, for which purpose it comprises storage compartment divisions that can be variably set in the horizontal and also the vertical direction and bear the item, still more flexible storage with fine adjustment to the items is possible.

In other words, storage compartment divisions are set in a variable manner in the rack based on the size of the item about to be placed into storage. These can be set in such a variable manner that there is practically no grid-pattern loss as in the prior art. The storage compartment divisions in accordance with the invention are also small such that a number of them are required to store an item but this means that no empty space is left.

"Settable" means herein that the storage compartment divisions can be fixed in the rack in a releasable manner. The settable storage compartment divisions are thus placed by reference to the item (size) as the item is being placed into storage. In so doing, the settable storage compartment divisions are preferably placed below the item and laterally of the item with the aid of the storage compartment for the item. The settable storage compartment divisions thus surround the respective item at least from below and from one side.

In a preferred embodiment, the settable storage compartment divisions are formed in a pin-like manner. These pins are then disposed in the rack such that a plurality of pins bear an item from below and further pins support the item laterally against slipping etc. The number of storage compartment divisions or pins used is dependent on the size and/or weight.

In a likewise preferred embodiment, the rack comprises on the rear wall side a fastening matrix extending over the width and height of the rack for fastening the settable storage compartment divisions. In other words, a type of perforated wall rack with a fastening matrix is provided in the rack and so the storage compartment divisions (or pins) can be releasably fixed at any fastening point as required in order to bear and laterally support an item in a manner adapted to its size without sacrificing space.

The actual fastening of the settable storage compartment divisions or pins is effected in any manner, in particular by screw connection or bayonet coupling or the like.

The fastening matrix can be formed by a rear wall over the entire surface or even e.g. by a multiplicity of individual transverse beams.

During placement into storage, the settable storage compartment divisions are expediently automatically set by means of a horizontally and vertically positionable storage compartment division setter. This is a type of nail gun, i.e. a fastening device with a magazine for the storage compartment divisions, in particular pins, which can be positioned horizontally and vertically by reference to the item size by a controller and effects the fastening of the storage compartment divisions on the rack or rear-side fastening matrix. The simplest arrangement is for the storage compartment division setter to be part of the rack serving apparatus, e.g. to be disposed below an item-carrying platform.

On the one hand, the rack can be positioned vertically and the item "only" horizontally by means of the rack serving apparatus. However, it is also possible for the rack serving apparatus to effect both vertical and also horizontal positioning and for the rack to be stationary. Conversely, the rack can also be movable and the rack serving apparatus stationary, in particular, the rack is at least vertically movable when it is small enough to be brought e.g. into a transporter.

Manual fastening of the storage compartment divisions is also possible.

A rack serving apparatus which can be used within the scope of the invention can comprise a height-variable lifting platform with a positionable transverse stop and a positionable longitudinal stop. Therefore, the item to be placed into storage can be placed precisely and can consequently also be positioned on an item already provided in the rack, laterally above or below, without leaving empty space. In addition, it can thus be ensured that the storage compartment divisions can be set simultaneously.

When the rack serving apparatus is attached to a supply conveyor and thus the lifting platform also comprises a transfer pusher which extends over the end of the supply conveyor, simple and rapid pick-up or transfer of the item and positioning thereof are possible.

The racks in accordance with the invention may preferably be usable where storage density is very important and little space is available. The places where they are used are e.g. in last-mile-transporter loading in a distribution center, i.e. the dispatch area of logistics centers. In particular, where space restriction is particularly critical, e.g. in the loading dock area of the logistics center or in the transporter, truck, container, etc. itself.

At this location, the use of space optimized to the respective delivery with a broad and variable range of articles and division of the storage compartments optimized in relation thereto are necessary. This can be realized in each case in a very flexible and real-time manner in the rack for individual articles, protective bags, 6-packs, packets, etc. by a pre-calculated or preset loading pattern of the storage compartment division by means of the adaptable storage compartment divisions. This means that such a rack can also be adapted multiple times at short notice within a day.

Furthermore, an automatic loading device for the compartments is possible, i.e. the rack must also be suitable for this. In addition, the rack is used in a transporter and so matters relating to the load securing of the item, and in the transporter could also possibly arise but these have only been described in general and not in detail.

The rack can thus also be designed to be mobile and so e.g. it can be loaded as a whole into a transporter. Alternatively it could be loaded with items directly in the transporter.

The invention also relates to a method for loading a rack with items, which is provided with storage compartments, having a rack serving apparatus which can move horizontally and vertically in order to place the items into storage and remove them from storage, wherein the respective storage compartment, during loading of the respective item, is adapted to the item both horizontally and also vertically in a flexible manner, for which purpose the rack comprises flexible adjustment of the storage compartments with storage compartment divisions which can be variably set both in the horizontal and vertical direction.

These and other objects, advantages, purposes, features and details of the invention will become apparent upon review of exemplified embodiments in the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures.

In the embodiment illustrated in the accompanying figures a device, designated as a whole by 1, is shown for storing items, having a rack 2 and a rack serving apparatus 11, wherein in order to place the items 100 into storage and to remove them from storage the rack serving apparatus 11 and the rack 2 are able to move horizontally and vertically relative to one another.

Figure 1:
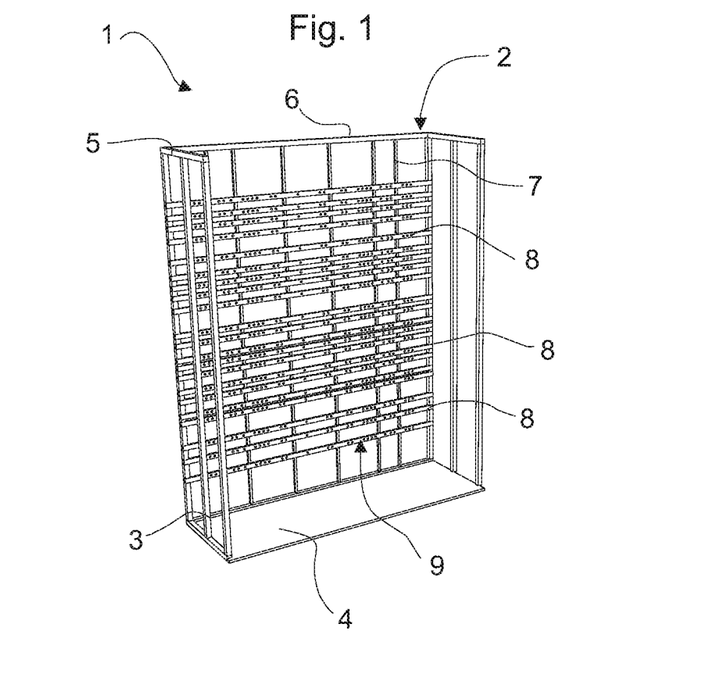
FIG. 1 is a schematic perspective view of a rack for storing items.

The rack 2 has a frame formed from lateral and rear vertical struts 3, 7 and a base plate 4 as well as lateral transverse struts 5 and a rear-side transverse strut 6. A multiplicity of transverse beams 8 at different heights are attached in a matrix-like manner to the rear vertical struts 7 and each comprise a multiplicity of fastening threads 9 along their extension, into which pin-like storage compartment dividers 21, to be described below, can be screwed.

Figure 2:
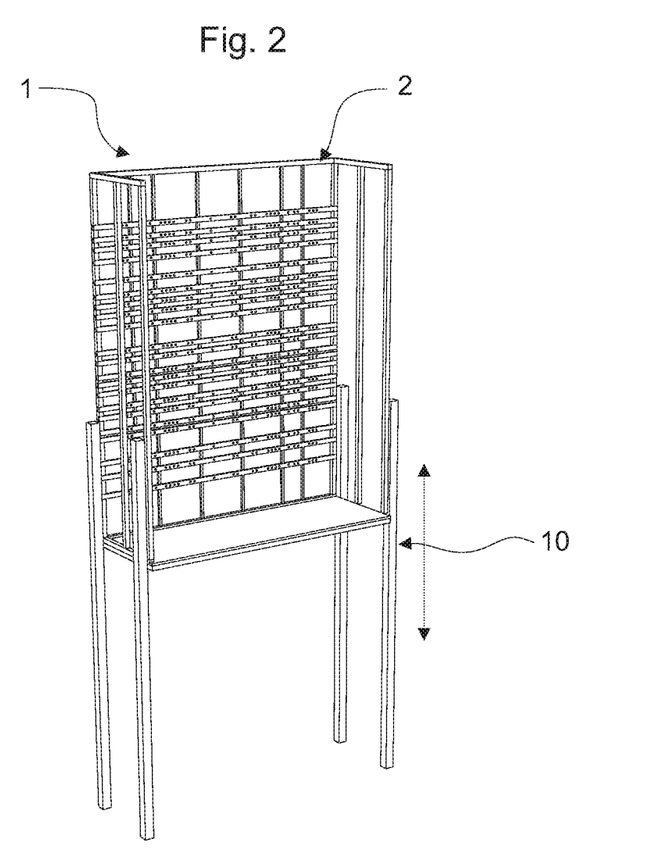
FIG. 2 is a schematic perspective view of the rack of FIG. 1 with a lifting device.
Figure 3:
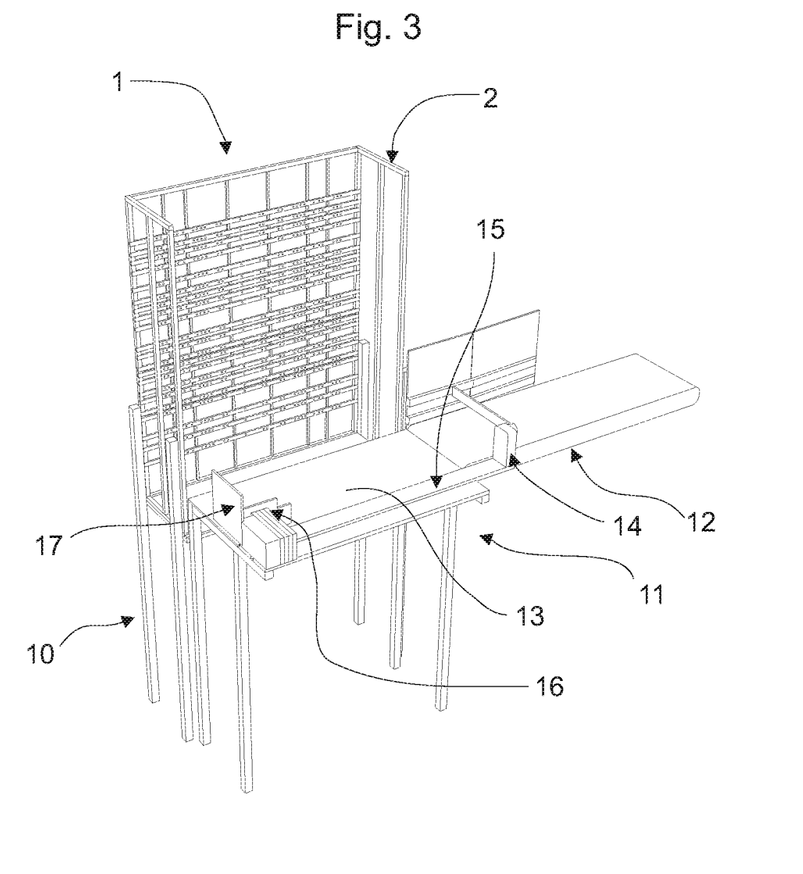
FIG. 3 is a schematic perspective view of the rack of FIG. 1 with a lifting device and a rack serving apparatus as well as a supply conveyor.

The rack 2 is vertically displaceable by means of a lifting mechanism 10 and so items 100 to be placed into storage can be positioned at the predetermined position, although the rack serving apparatus 11 and the supply belt conveyor 12, which delivers the items 100 to be placed into storage, are vertically stationary.

Figure 4:
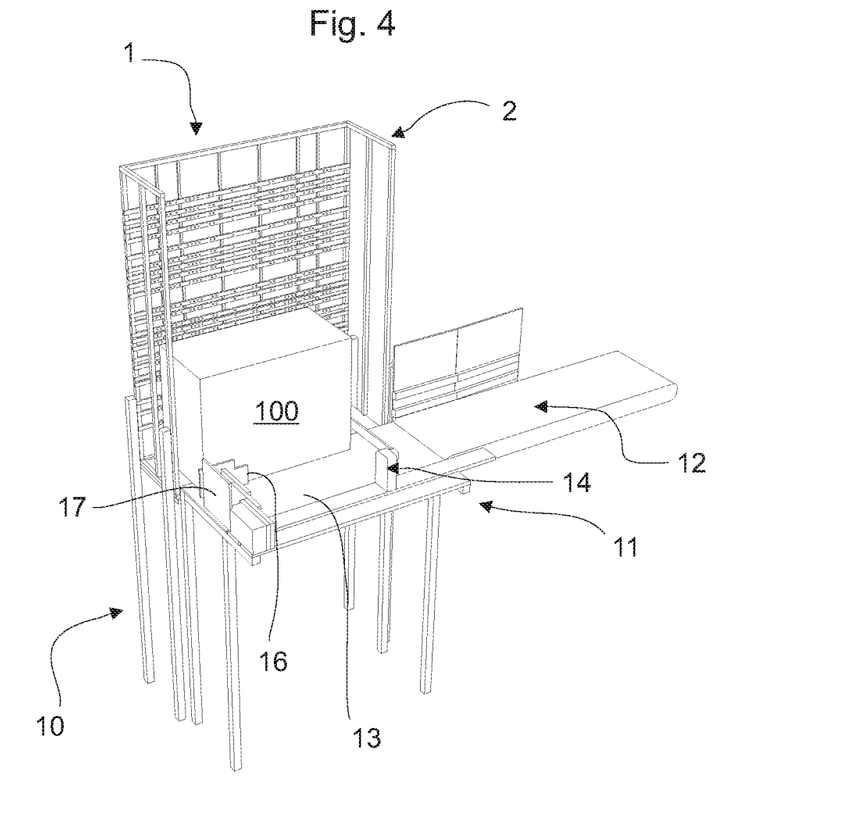
FIG. 4 is a schematic perspective view of the rack of FIG. 3 during loading.

At the end of the supply belt conveyor 12, a pusher 14, driven and guided on a linear guide 15, takes the items 100 and places them on a platform 13 against a positionable transverse stop 16 and a positionable longitudinal stop 17 which have been prepositioned according to the precalculated position of the respective item 100 in the rack 2. The transverse stop 16 then pushes the item 100 against the rear vertical struts 7.

Figure 5:
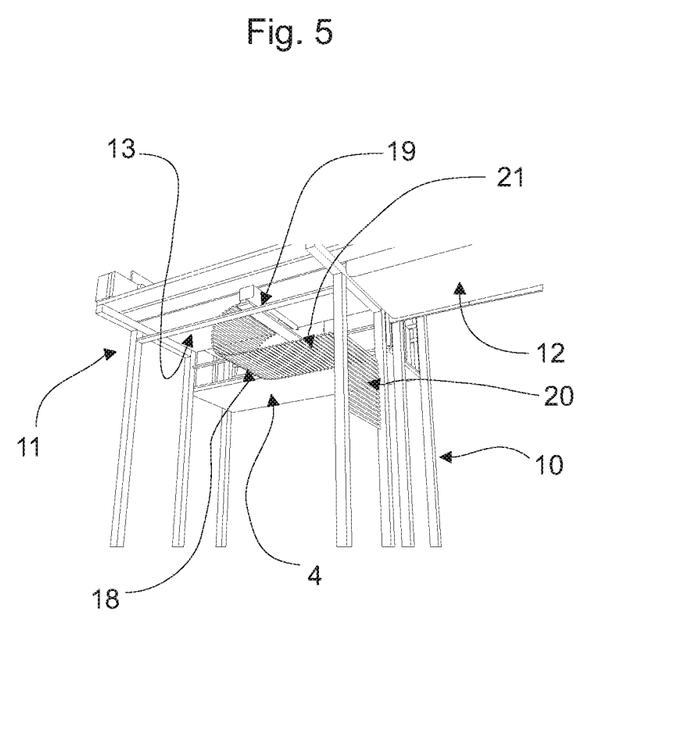
FIG. 5 is a schematic perspective view of the rack of FIG. 4 from below.

At the same time, the necessary number of pin-like storage compartment dividers 21 are fastened by a storage compartment division setter 18 into the fastening threads 9 below the platform 13 or the item 100 on the transverse beams. In the illustrated embodiment, the storage compartment division setter 18 comprises the actual screw-in device 19 and a magazine 20 for supplying pin-like storage compartment dividers 21.

Figure 6:
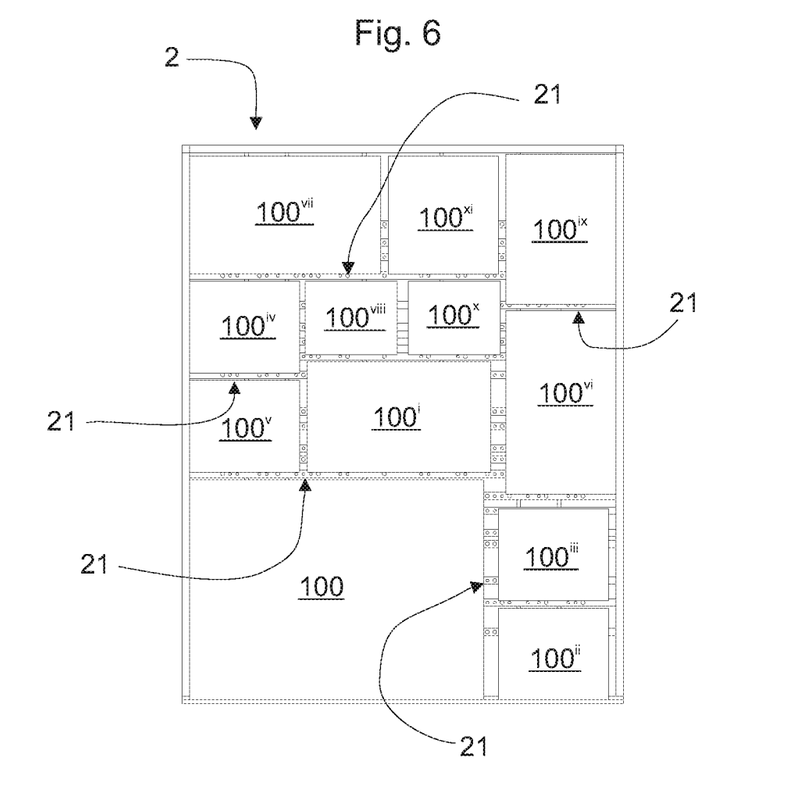
FIG. 6 is a schematic view of the rack of FIG. 1 in the loaded state.
Figure 7:
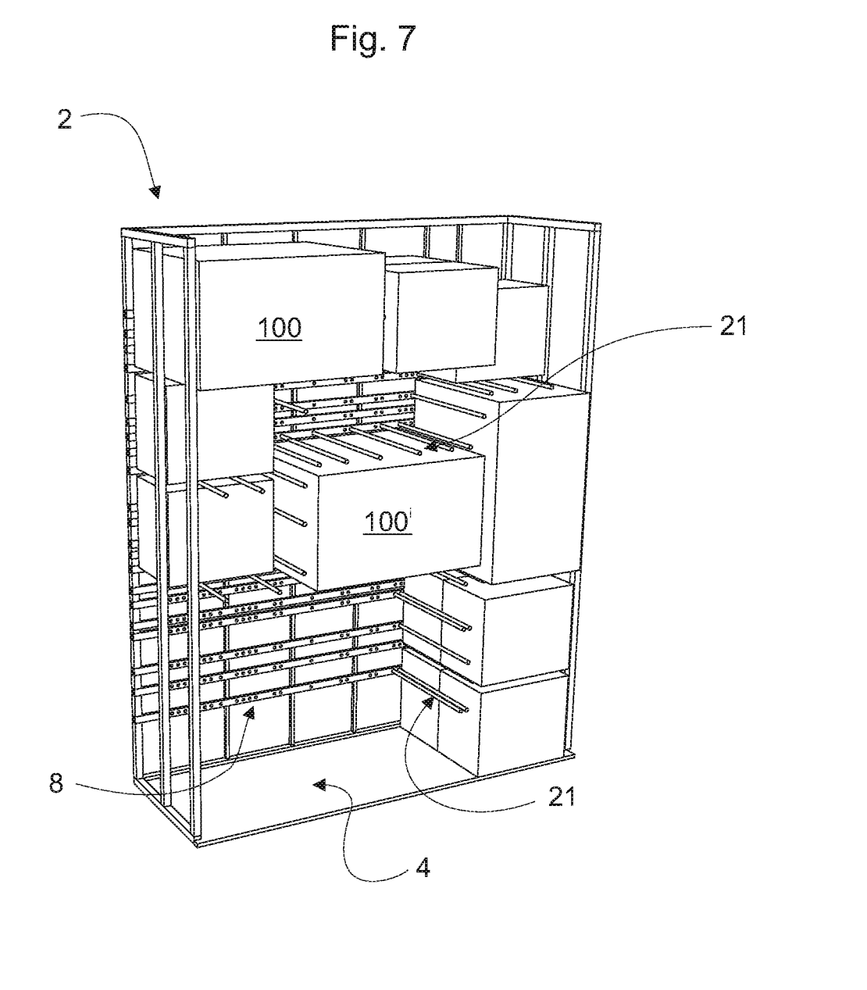
FIG. 7 is a schematic perspective view of the rack of FIG. 1 in the partially loaded state.

Subsequently, depending on the next item 100', laterally next to the last-positioned item 100, further pin-like storage compartment dividers 21 can be attached. Thus, e.g. gradually a loading pattern as illustrated in FIG. 6 is created. It will be recognized that in comparison to conventional racks there is practically no wasted space. The rack 2 can then be loaded e.g. into a transporter. If the rack 2 serves for transportation purposes, the pin-like storage compartment dividers 21 can also be fitted with load-securing protrusions. Different lengths of pin-like storage compartment dividers 21 can also be used. Once it has been emptied, the pin-like storage compartment dividers 21 can be removed and the rack 2 can be divided up again.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A device for storing items, comprising:
    a rack, the rack configured to be provided with adjustable storage compartments; and
    a rack serving apparatus;
    wherein the rack serving apparatus and the rack are moveable horizontally and vertically relative to one another in order to place items into storage and to remove items from storage, wherein the rack comprises settable storage compartment divisions that form the storage compartments and are configured to be variably positioned both in a horizontal direction and in a vertical direction and bear items to provide a variable adjustment of the storage compartments, wherein the settable storage compartment divisions are formed as elongate pin members; and
    wherein the rack comprises a fastening matrix disposed on a rear wall side of the rack extending over a width and a height of the rack and to which the settable storage compartment divisions are selectively fixed to form the storage compartments; and
    wherein the settable storage compartment divisions are fixed to the fastening matrix by a horizontally and vertically positionable storage compartment division setter during placement of items into storage, and wherein the storage compartment division setter is part of the rack serving apparatus; and wherein the settable storage compartment divisions are positioned and fixed to the fastening matrix according to a particular item that is to be stored when the particular item is being placed into storage, and according to another item that is below the particular item and/or laterally of the particular item.

2. The device as claimed in claim 1, wherein the rack serving apparatus comprises a height-variable lifting platform with a first stop positionable transverse to the rack and a second stop positionable longitudinal to the rack.

3. The device as claimed in claim 2, wherein the rack serving apparatus is attached to a supply conveyor.

4. The device as claimed in claim 3, wherein the lifting platform comprises a transfer pusher that extends over an end of the supply conveyor.

5. The device as claimed in claim 1, wherein the rack is mobile.

6. The device as claimed in claim 1, wherein the rack serving apparatus is attached to a supply conveyor.

7. A device for storing items, comprising:
a rack, the rack configured to be provided with adjustable storage compartments; and
a rack serving apparatus;
wherein the rack serving apparatus and the rack are moveable horizontally and vertically relative to one another in order to place items into storage and to remove items from storage, wherein the rack comprises settable storage compartment divisions that form the storage compartments and are configured to be variably positioned both in a horizontal direction and in a vertical direction and bear items to provide a variable adjustment of the storage compartments, wherein the settable storage compartment divisions are formed as elongate pin members, and
wherein the rack comprises a fastening matrix disposed on a rear wall side of the rack and extending over a width and a height of the rack and to which the settable storage compartment divisions are selectively fixed to form the storage compartments; and
wherein the settable storage compartment divisions are fixed to the fastening matrix by a horizontally and vertically positionable storage compartment division setter during placement of items into storage;
wherein the settable storage compartment divisions are positioned and fixed to the fastening matrix according to a particular item that is to be stored when the particular item is being placed into storage, and according to another item that is below the particular item and/or laterally of the particular item, and wherein the rack serving apparatus is attached to a supply conveyor.

8. The device of claim 7, wherein the storage compartment division setter is part of the rack serving apparatus.

9. The device as claimed in claim 7, wherein the rack serving apparatus comprises a height-variable lifting platform with a first stop positionable transverse to the rack and a second stop positionable longitudinal to the rack.

10. The device as claimed in claim 9, wherein the lifting platform comprises a transfer pusher that extends over an end of the supply conveyor.

11. The device as claimed in claim 7, wherein the rack is mobile.

* * * * *